2,922,808
SOLVENT EXTRACTION PROCESS

Paul N. Rylander, Newark, N.J., assignor to Standard Oil Company, Chicago, Ill., a corporation of Indiana No Drawing. Application December 23, 1957
Serial No. 704,242

6 Claims. (Cl. 260—450)

The present invention relates to the extraction of oil-soluble, water-immiscible alcohols from normally liquid hydrocarbons, and particularly concerns the use of liquid 2-pyrrolidone as a selective solvent for this purpose.

An object of the present invention is to provide a method for removing dissolved water-immiscible alcohols from mixtures thereof with liquid hydrocarbons. Another object is to provide a method for removing such alcohols from mixtures thereof with liquid hydrocarbons and organic carbonyl compounds. A further object is to provide a method for recovering valuable oil-soluble chemicals from the products of hydrogenation of carbon monoxide in the presence of an iron catalyst. Other objects and advantages of the invention will be apparent from the detailed description thereof.

It has been found that oil-soluble alcohols can be extracted from a mixture of the alcohol with normally liquid hydrocarbons by employing liquid 2-pyrrolidone as the selective solvent. Mixtures such as cannot readily be separated by distillation due to the closeness of the boiling points of the hydrocarbon and alcohol or because of azeotrope formation are readily separated by extraction with liquid 2-pyrrolidone. The process is selective for extracting alcohols in preference to organic carbonyl compounds such as aldehydes and ketones, and improved selectivity can be obtained by scrubbing the extract (either during the extraction process or after separation of an extract phase) with a liquid hydrocarbon. The scrubbing hydrocarbon is one that boils outside the boiling range of the components of the mixture undergoing separation. The oil-soluble products obtained from the hydrogenation of carbon monoxide using an iron catalyst can be extracted from liquid 2-pyrrolidone after carboxylic acids have been removed from the oil-soluble products, thereby extracting valuable oil-soluble alcohols and simultaneously purifying the hydrocarbons and rendering them more suitable for subsequent processing.

2-pyrrolidone, which is often termed gamma-butyrolactam, has the structural formula $HNCH_2CH_2CH_2CO$. It is a cyclic amide. Its melting point is 25° C. and has a boiling point of 245° C. It may be synthesized by heating gamma-aminobutyric acid to split out water whereupon the cyclic amide 2-pyrrolidone is formed.

The liquid 2-pyrrolidone can be used in the solvent extraction of mixtures of normally liquid hydrocarbons and oil-soluble, water-immiscible alcohols. The extract phase of 2-pyrrolidone is rich in extracted alcohols and the hydrocarbon raffinate phase is depleted in the alcohols. In this manner oil-soluble alcohols, which are essentially immiscible with water, such as contain from about 4 to 15 carbon atoms per molecule can be extracted from normally liquid hydrocarbons. The particular type of hydrocarbon present has no critical bearing upon the extraction process, and it may be an aromatic, cyclo-aliphatic or aliphatic hydrocarbon, e.g. paraffin, olefin, or it may consist of mixtures of various hydrocarbons. The mixture undergoing extraction may consist of a wide boiling range mixture of hydrocarbons and alcohols or a narrow boiling range mixture. The present invention is particularly useful for separating mixtures which cannot ordinarily be separated by distillation due to the closeness of boiling points of the hydrocarbon and alcohol or because azeotropes are formed between the hydrocarbon and alcohol.

Chemical manufacturers often have mixtures of water-immiscible, oil-soluble alcohols with normally liquid hydrocarbons. Such mixtures are formed during the oxidation of hydrocarbons such as paraffinic and/or olefinic hydrocarbons. They are also formed during the hydrogenation of carbon monoxide by the Fischer-Tropsch process and its various modifications. As an example of this type process, carbon monoxide and hydrogen are contacted with an iron catalyst at a temperature between about 450 to 750° F. and a pressure between about 100 to 700 p.s.i.g. Streams of water-soluble and oil-soluble chemicals are produced. The water-soluble alcohols may readily be recovered from the products by water washing techniques, but the oil-soluble alcohols are difficult to remove from the hydrocarbons which are produced during the process. The oil-soluble organic chemicals, which form a homogeneous solution in the liquid hydrocarbons, consist of carboxylic acids, alcohols, aldehydes and ketones, and a small amount of esters. The composition of such a stream is given in Industrial and Engineering Chemistry, volume 45, pages 359–362 (February 1953). The carboxylic acids may be removed from the hydrocarbon stream containing the oil-soluble chemicals by extracting with aqueous solutions of sodium carbonate, or by other techniques. Thereafter the hydrocarbon stream of oil-soluble chemicals may be extracted with liquid 2-pyrrolidone to remove the alcohols from the hydrocarbons. Either a wide boiling range portion of the oil-soluble chemicals stream may be extracted, or a narrow boiling mixture may be extracted. This solvent is quite selective for extracting the alcohol from the hydrocarbon. It has only slight effectiveness for extracting aldehydes and ketones from the hydrocarbons. Asus it may also be used to extract alcohols from aldehydes and/or ketones.

When it is desired to remove the maximum amount of the various oil-soluble oxygenated hydrocarbons present in the hydrocarbon stream containing dissolved alcohols, carbonyl compounds, etc. from the Fischer-Tropsch process or from similar streams from hydrocarbon oxidation processes, the hydrocarbon oil containing the dissolved oil-soluble oxygenated hydrocarbons may be selectively hydrogenated to convert aldehydes and ketones therein to alcohols. Because alcohols are extracted by liquid 2-pyrrolidone with high efficiency, a more complete purification of the hydrocarbons is obtained during the solvent extraction step. This renders the raffinate hydrocarbon phase more suitable for subsequent use such as for deoxygenation and conversion of the hydrocarbons to gasoline constituents. The hydrogenation may be carried out at temperatures of 50 to 150° C. using catalysts such as nickel on kieselguhr or copper chromite and thereby effecting conversion of the carbonyl compound to the alcohol without any substantial conversion of alcohols to hydrocarbons. Method for effecting selective reduction of a carbonyl group are taught in "Reactions of Hydrogen," by H. Adkins, pages 8, 11, University of Wisconsin Press (1937).

In general, liquid-liquid extraction operations can be carried out with 2-pyrrolidone at temperatures of from somewhat above its melting point up to about 200° C., preferably at a temperature between about 30° C. and 100° C. The particular temperature used will depend upon the particular charging stock, the solvent:feed ratio, the number of extraction stages, the degree of extraction which is sought, the proportions of auxiliary solvents or countersolvents, etc.

The ratio of solvent to the charge mixture of hydrocarbons and alcohol undergoing separation, must be sufficient to exceed the solubility of the solvent in the charge stock in order to form two distinct liquid phases, viz. a raffinate phase of hydrocarbons containing little if any solvent, and an extract phase of solvent containing the alcohols as the solute. Generally, between about 0.2 to 10 volumes of solvent may be used per volume of the charge mixture which is to be separated. Equal volumes of solvent and charge mixture constitute a very satisfactory ratio. A small amount of water, e.g. 1 to 20% based on solvent, may be introduced into the extraction zone to increase the selectivity of the solvent for extracting alcohols. To increase the selectivity for removing alcohols in preference to hydrocarbons or carbonyl compounds such as aldehydes and ketones, a hydrocarbon countersolvent may be used. This countersolvent is preferably one which boils outside the boiling range of the charge mixture undergoing separation and outside the boiling range of the solvent. In this way it can be fractionated to separate it from the hydrocarbon raffinate phase and the extract phase (when any amounts are left in this latter phase). The countersolvent may be used during the extraction process by introducing it into the extraction zone so that it scrubs the extract phase as it passes through the extraction zone. In this manner it scrubs out the carbonyl compounds and any minor amounts of hydrocarbons which may have been extracted from the charge mixture. Washing with the hydrocarbon countersolvent may also be carried out after the extract phase has been separated from the raffinate phase. In this manner the separated extract phase may be scrubbed in a tower or other suitable equipment to remove the extracted carbonyl compounds and hydrocarbons from the extract phase. The alcohols may then be recovered from the extract phase in good purity by distilling to separate them from the solvent. Other techniques besides distillation may be used to recover the alcohols from the solvent, e.g. washing the extract phase with water to dissolve out the solvent and then recovering the solvent from the water. Likewise, any dissolved solvent can be recovered from the raffinate phase by washing with water. The extraction process can be carried out in a batch, continuous or semicontinuous manner, and in one or more actual or theoretical stages, employing contacting equipment such as has heretofore been employed in the selective solvent refining art.

Certain solvent extractions were carried out which are illustrative of the present invention. A mixture of hydrocarbons and oil-soluble oxygenated compounds which was prepared by the hydrogenation of carbon monoxide in the presence of an iron catalyst (modified Fischer-Tropsch process) was obtained. The carboxylic acids had been removed from this mixture, and the mixture had been fractionated to obtain the charging stock employed in the solvent extraction step. The fraction charged to the solvent extraction step consisted of approximately 58.5 volume percent $C_{10-11}$ olefins, 11.0 volume percent saturated hydrocarbons, 7.5 volume percent aromatics, and 23.0 volume percent oxygen-containing hydrocarbons. The saturated hydrocarbons, aromatics, and oxygen-containing hydrocarbons boiled within the same range as the $C_{10-11}$ olefins. The alcohols, which were primarily $C_7$ alcohols, comprised about 11.8% of the mixture charged to extraction, the aldehydes comprised about 8.0% of the mixture charged to extraction, and the remaining 2-3% consisted primarily of ketones with a minor amount of other oxygenated hydrocarbons. 50 ml. of the above defined mixture was shaken with 50 ml. of 2-pyrrolidone at about room temperature. A raffinate layer of 40 ml. and an extract layer of 60 ml. were thereafter separated. Analysis of the raffinate, after washing with water to remove any dissolved solvent, indicated that about 90% of the alcohol had been extracted therefrom. Analysis of the raffinate further indicated that only about 12% of the aldehydes and ketones had been extracted from the charge mixture. This demonstrates the effectiveness of the solvent for removing oil-soluble alcohols from hydrocarbons and also from organic carbonyl compounds.

Thus having described the invention what is claimed is:

1. A method for refining a mixture comprising normally liquid hydrocarbons and oil-soluble water-immiscible alcohols, which process comprises selectively extracting said mixture with liquid 2-pyrrolidone, and separating a liquid extract phase.

2. The method of claim 1 wherein the hydrocarbon-alcohol solution is not readily separable by distillation.

3. The method of claim 1 wherein the mixture which is extracted with said liquid 2-pyrrolidone is produced by hydrogenating carbon monoxide in the presence of an iron catalyst and thereby producing water-soluble oxygenated organic compounds, water-immiscible oil-soluble oxygenated organic compounds and hydrocarbons, recovering a mixture of hydrocarbons containing dissolved water-immiscible oil-soluble organic oxygenated compounds comprised of carboxylic acids, alcohols, aldehydes and ketones, removing carboxylic acids from the mixture of hydrocarbons and dissolved oil-soluble organic oxygenated compounds, and thereafter extracting with liquid 2-pyrrolidone the mixture of hydrocarbons and organic oxygenated compounds from which carboxylic acids had been removed.

4. The method of claim 1 wherein the mixture of hydrocarbons and alcohols contains aldehydes, and where said mixture is hydrogenated to convert aldehydes to alcohols, and is thereafter extracted with liquid 2-pyrrolidone.

5. A method for refining a mixture comprising normally liquid hydrocarbons and water-immiscible alcohols and organic carbonyl compounds which process comprises agitating said mixture with an amount of liquid 2-pyrrolidone sufficient to form distinct extract and raffinate phases, washing said extract phase with normally liquid hydrocarbons and thereby scrubbing organic carbonyl compounds from said extract phase, and recovering a scrubbed extract phase of 2-pyrrolidone rich in alcohol.

6. The method of claim 5 wherein the liquid hydrocarbon employed in scrubbing the extract phase boils at a temperature outside the boiling range of the components of the mixture charged to the refining step.

References Cited in the file of this patent

UNITED STATES PATENTS

| | | |
|---|---|---|
| 2,059,495 | Smeykal | Nov. 3, 1936 |
| 2,205,184 | Woodhouse | June 18, 1940 |
| 2,542,454 | Arnold et al. | Feb. 20, 1951 |
| 2,543,038 | McGrath | Feb. 27, 1951 |
| 2,558,556 | Hess et al. | June 26, 1951 |
| 2,615,912 | Michael | Oct. 28, 1952 |
| 2,625,560 | Michael | Jan. 13, 1953 |
| 2,737,538 | Nelson | Mar. 6, 1956 |
| 2,771,494 | Weedman | Nov. 20, 1956 |

UNITED STATES PATENT OFFICE

CERTIFICATE OF CORRECTION

Patent No. 2,922,808                              January 26, 1960

Paul N. Rylander

It is hereby certified that error appears in the printed specification of the above numbered patent requiring correction and that the said Letters Patent should read as corrected below.

Column 1, line 46, for "extracted from liquid" read -- extracted with liquid --; column 2, line 41, for "Asus" read -- Thus --.

Signed and sealed this 5th day of July 1960.

(SEAL)
Attest:

KARL H. AXLINE
Attesting Officer

ROBERT C. WATSON
Commissioner of Patents